United States Patent Office 3,464,391
Patented Sept. 2, 1969

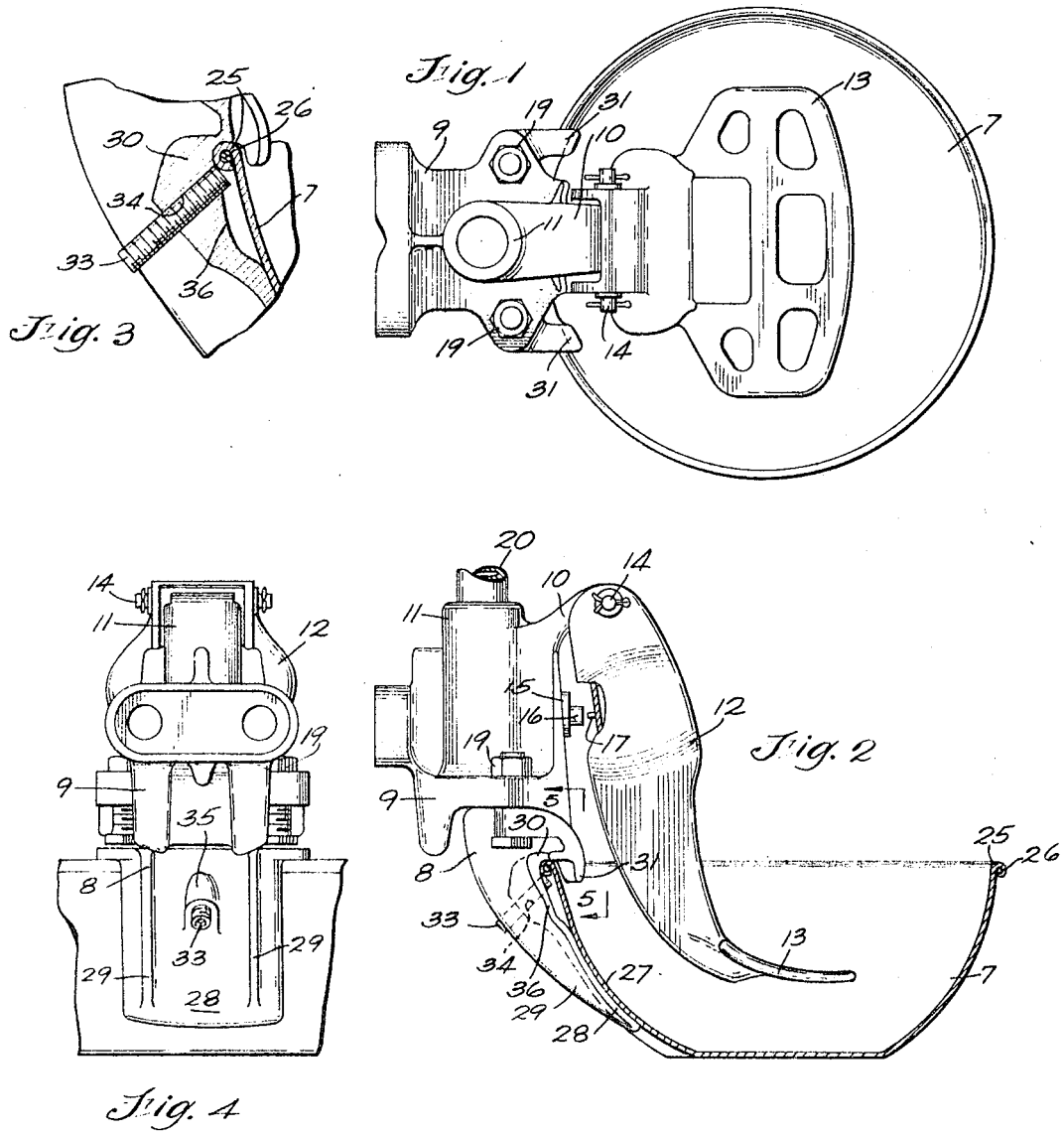
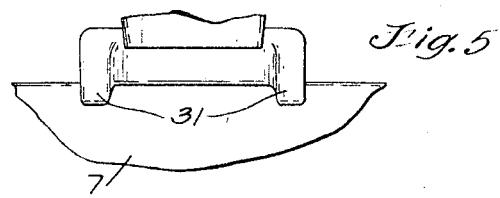

3,464,391
ANIMAL DRINKING FOUNTAIN
George D. Prentice, Milwaukee, Wis., assignor to A. F. Klinzing Co., Inc., Milwaukee, Wis., a corporation of Wisconsin
Filed Oct. 17, 1967, Ser. No. 675,870
Int. Cl. A01k 7/00; F16k 31/62
U.S. Cl. 119—75    6 Claims

ABSTRACT OF THE DISCLOSURE

An animal drinking fountain having a water supply valve controllable by a nose operable lever to supply drinking water to a bowl which is secured in position against displacement by a clamp coacting with the rim and side wall of the bowl.

Background

It has heretofore been customary to utilize animal drinking fountains for livestock which embody a drinking bowl having a water supply valve at the rear portion thereof operable by a lever extending into the bowl and manipulable by the nose of a thirsty animal to admit water from the valve into the bowl.

Since such devices are subject to extremely rough treatment by the animals being watered, special care must be taken to provide means for preventing accidental displacement of the valve actuating levers and other components such as the drinking bowls, and it is of course also desirable to provide for simplicity and economy in the construction and maintenance of these watering fountains.

However, while structures such as that disclosed, for example, in my United States Patent No. 3,095,856, dated July 2, 1963, have enjoyed considerable commercial acceptance, all of the prior watering devices have left something to be desired in failing to provide simple, economical and effective means for retaining the bowl firmly in position despite the rough usage to which these drinking fountains are subjected.

Summary

An object of the present invention is to provide an improved livestock watering fountain of the general type hereinabove described which embodies an improved simple and highly effective bowl retaining clamp.

Another object of this invention is to provide improved clamping means for effectively preventing displacement of the bowl of an animal drinking fountain which may nevertheless be readily released and removed by an attendant for servicing and/or replacement.

Still another object of the invention is to provide a highly efficient drinking bowl supporting and clamping means for animal watering fountains which does not interfere with the animal's use of the device, which does not in any way affect the capacity thereof, and which effectively prevents dislodging of the bowl upwardly, downwardly or in any direction whatsoever.

A further object of the invention is to provide an improved drinking bowl retaining clamp for animal watering fountains which securely locks the bowl against displacement by means of a single readily accessible and manipulable locking screw or the like cooperable with the beaded rim of a standard sheet metal bowl to urge the bowl lip firmly against an upper reaction surface having depending abutment fingers extending interiorly of the bowl lip while the exterior wall of the bowl is also effectively supported against tilting and downward displacement.

These and additional objects and advantages of the invention will become apparent from the following detailed description.

The drawings

A clear conception of the features constituting the present improvement, and of the construction and operation of a typical commercial animal watering fountain embodying the invention, may be had by referring to the drawing accompanying and forming a part of this specification wherein like reference characters designate the same or similar parts in the various views.

FIGURE 1 is a top view of a typical animal drinking or watering fountain embodying the invention;

FIGURE 2 is a part-sectional side elevation of the drinking fountain with the nose lever in active position within the bowl and with the bowl clamped in place;

FIGURE 3 is a fragmentary vertical section through the bowl clamp and lip portion of the bowl;

FIGURE 4 is a fragmentary view taken from the rear of the bowl clamp; and

FIGURE 5 is a fragmentary view of the bowl clamping portion taken in the direction of the arrows 5—5 of FIGURE 2.

Detailed description

While the invention has been shown and described herein as being embodied in a self-service fountain especially adapted to supply drinking water for cattle or livestock, it may be advantageously applied to watering devices intended for other purposes and of somewhat different general construction. It is also contemplated that certain specific descriptive terms used herein shall be given the broadest possible interpretation consistent with the disclosure.

Referring to the drawing, the animal drinking fountain shown therein as embodying the invention comprises, in general, an annular water receptacle or bowl 7 having its rear portion thereof firmly attached, in a manner hereinafter more fully described, to a clamp support 8. The support 8 is clamped to a normally fixed stationary support or bracket 9 provided with an upper suspension lug 10 extending upwardly and outwardly therefrom. The support 9 also includes a water supply casing or housing 11, and a nose actuable lever 12 having a nose contact plate 13 normally disposed within the bowl 7 is pivotally secured as at 14 to the suspension lug 10.

A water delivery valve 15 is communicable with the interior of the casing 11 in a well known manner, the valve 15 including an operating stem 16 which extends outwardly of the valve toward the pivotally mounted lever 12. In turn, the lever 12 is provided with an operating projection 17 which extends toward the valve stem 16 to open the valve 15 whenever the nose piece 13 is depressed by the animal desiring water.

The bowl 7 may conveniently be formed of sheet metal and the support 8 and bracket 9 may be formed of metal castings or the like. The support 8 may be secured to the bracket 9 in any convenient manner, and in the devices illustrated, these parts are firmly but detachably united by means of bolts 19. The suspension lug 10 and the water supply housing 11 may be cast as an integral unit with the bracket 9 which serves as a mounting for the entire unit, and drinking water may be supplied to the housing 11 through a delivery pipe 20 communicable with a suitable water supply. The valve 15 for delivering water to the bowl 7 upon actuation of the lever 12 may be of any well known construction such as a ball type wherein the ball is seated by a spring which constantly urges the actuating stem 16 outwardly, and the stem 16 may be rendered adjustable from the exterior in a well known manner without dismantling the valve.

In accordance with the present invention, the bowl 7 is provided with a beaded brim or lip 25 which is formed as by rolling the marginal edge of the bowl outwardly and downwardly over an annular steel rod 26. In turn, the clamp 8 is formed with a downwardly and outwardly curved supporting and backing leg 28, the curvature of the leg 28 corresponding to that of the bowl side wall 27. The leg 28 should preferably be of considerable length and width so as to provide an extensive bearing surface for the side wall 27 of the bowl, and to aid strength and rigidity, laterally spaced backing ribs 29 may be provided. The clamp 8 is additionally formed with an outwardly projecting stop and bearing lug 30 of considerable width to provide a bearing surface for the beaded lip 25 of the bowl 7, the lug 30 being curved in a horizontal plane to conform with the curvature of the bowl lip 25, and the bearing lug 30 is, in turn, formed with a pair of laterally spaced depending ears 31 cooperable with the interior of the bowl wall 27 immediately adjacent the lip 25 to positively position the bowl 7 within the clamp 8.

The bowl 7 may thus be swung into and out of bowl receiving and supporting position as afforded by the clamp 8, and means is additionally provided for positively retaining the bowl in clamped condition. Such means comprises a locking screw or set screw 33 extending through a threaded bore 34 in the clamp 8. As shown, the threaded bore 34 is formed in a boss 35 near the upper end of the leg 28 and extends upwardly therethrough at about a 45° angle. Thus, with the bowl 7 positioned within the clamp 8 as shown in FIGURE 2, the set screw 33 may be tightened to exert an upwardly and outwardly directed force against the relatively heavy and reinforced beaded lip 25 of the bowl. This causes the beaded lip 25 to seat firmly against the bearing surface of the lug 30 with the wall 27 of the bowl seated firmly against the bearing surface of the leg 28, displacement of the bowl being positively prevented by the coaction of the angularly directed set screw 33 and depending ears 31 with the beaded bowl lip 25.

From the foregoing detailed description, it is believed apparent that the present invention contemplates the provision of an improved bowl clamp for a stock watering fountain which is extremely simple in construction and highly efficient and effective in actual use. The set screw 33 for locking the bowl in position within the clamp 8 is readily accessible from the rear of the device while not in any way interfering with the operation of the drinking fountain. The location of the set screw furthermore discourages tampering by unauthorized personnel and presents no problems whatsoever insofar as the livestock are concerned. The set screw 33 may, of course, be provided with a suitable wrench receiving opening or with a slot for reception of a screw driver or other tool, and the positioning of this set screw to exert an upwardly and outwardly directed force against the heavily reinforced lip 25 of the drinking bowl 7 is extremely important and provides for accurate positioning of the bowl for retention against unauthorized displacement thereof. When it is desired to remove the bowl 7 for cleaning or replacement, it is only necessary to back off the set screw 33 a sufficient distance to permit the bowl to be swung upwardly at its forward portion remote from the clamp 8, and to facilitate removal, the upper portion of the leg 28 of the clamp 8 may be recessed as at 36 to permit somewhat freer movement of the beaded lip 25. The improved devices have proven highly successful in actual use, and the clamps may be readily produced at extremely low cost for use with bowls which may be conveniently and economically formed of sheet metal.

Various modes of carrying out the invention are contemplated as being within the scope of the subject matter which is regarded as the invention.

I claim:

1. In a self-serving animal drinking fountain, a fixed support, a liquid supply valve carried by said support and having an actuating stem extending therefrom, a valve actuating lever pivotally suspended from said support and having a nose contacting plate, said lever being provided with a projection engageable with said valve stem to actuate said valve, a bowl receiving and retaining clamp secured to said support, a bowl including an outwardly extending lip supported by said clamp in position to receive water discharged by said valve, said bowl receiving and retaining clamp comprising, a downwardly and outwardly directed leg engageable with the side wall of the bowl, an outwardly projecting stop and bearing lug engageable with the lip of the bowl and having a pair of laterally spaced depending ears cooperable with the interior of the bowl adjacent its lip, and adjustable means located between the ears for exerting an upwardly and outwardly directed clamping force against the bowl lip to positively engage said lug and the side wall to positively engage said leg.

2. An animal drinking fountain according to claim 1, wherein the bowl is provided with an outwardly and downwardly curved lip forming a continuous bead against which the clamping force is directed.

3. An animal drinking fountain according to claim 2, wherein the adjustable means for exerting an upwardly and outwardly directed clamping force is a threaded member extendible through a threaded bore in the leg of the clamp.

4. An animal drinking fountain accordng to claim 2, wherein the upwardly and outwardly directed clamping force is directed against the beaded lip of the bowl at an angle of approximately 45°.

5. An animal drinking fountain according to claim 2, wherein the clamping force is directed against the beaded lip of the bowl toward and medially of the laterally spaced depending ears.

6. An animal drinking fountain according to claim 2, wherein the bowl is curved to conform with the curvature of the leg of the clamp, said leg being formed with laterally spaced reinforcement ribs.

References Cited

UNITED STATES PATENTS

| | | | |
|---|---|---|---|
| 1,428,577 | 9/1922 | Ackerman | 119—75 |
| 1,824,116 | 9/1931 | Boyden | 119—75 |
| 1,879,788 | 9/1932 | Brown | 119—75 |
| 2,362,620 | 11/1944 | Eischens | 119—75 |
| 2,941,320 | 6/1960 | Caddel | 248—311 |
| 3,095,856 | 7/1963 | Prentice | 119—75 |

ALDRICH F. MEDBERY, Primary Examiner

U.S. Cl. X.R.

248—313; 211—71